Patented Feb. 27, 1951

2,543,338

UNITED STATES PATENT OFFICE 2,543,338

AROMATIC DIAMINES AS COUPLING COMPONENTS FOR THE FORMATION OF PHOTOGRAPHIC AZINE DYESTUFF IMAGES

Willy A. Schmidt and Joseph A. Sprung, Easton, Pa., assignors to General Aniline & Film Corporation, New York, N. Y., a corporation of Delaware No Drawing. Application March 18, 1948, Serial No. 15,734

20 Claims. (Cl. 95—6)

The present invention relates to color photography and more particularly to the production of azine dyestuff images by the color development of exposed silver halide emulsion layers.

This application is a continuation-in-part of our application Serial No. 577,134, filed February 9, 1945, entitled "Preparation of Azine Dyestuff Images," now abandoned.

One of the best known methods for the production of color images in color photography involves the reaction of a color component with the oxidation products of a primary aromatic amino developer by which dyestuff images are produced in situ with the silver image. By eliminating the silver image associated with the dyestuff image by resort to a mild bleaching agent such as potassium ferricyanide, a pure dyestuff image remains. This method, which was devised by Fischer and is described in United States Patent No. 1,102,028, is commonly referred to in the art as the color-forming development method.

The color-forming components which are generally utilized by the art for reaction with the oxidation products of the primary aromatic amino developer, are phenols, aromatic primary amines and compounds containing a reactive methylene group such as acetoacetic acid derivatives, pyrazolones and the like. By the reaction between these compounds and said oxidation products, there are produced quinonimine or azo methine dyes. By a proper selection of the components used it is possible to form in the various layers of a multilayer film substractively colored dyestuff images, to wit, yellow, magenta and cyan.

These color-forming components, in order to react effectively with the oxidation products of the developer, must contain a free coupling position. In the phenols and aromatic amines this position is usually para to the phenolic hydroxy or amino group, and such position must be either unsubstituted or if substituted, then by a substituent group which is displaced during color-forming development. Such substituents are the sulfonic acid group, halogen such as chlorine, bromine and the like, or the azo group. It is recognized in the literature that such substituents even when in para position to the coupling directing phenolic hydroxyl or amino group do not impede the color development reaction because of the facility with which they are displaced to yield an unsubstituted coupling position.

In the pyrazolones the free coupling position is occupied by the carbon atom of the reactive methylene group. Because of the tautomerizable nature of the keto group of the pyrazolone, said carbon atom is conditioned for coupling with the oxidized primary amine of the developer.

While it is relatively simple by the known method to produce the dyestuff images, the method is not always satisfactory for the reason that the quinonimine and azo-methine dyestuffs do not have optimum properties as regards stability to light and to various chemical reagents. Thus many of the dyes are acid-sensitive and fade or lose their color values when subjected to the action of acidic materials. The same is true when the film is stored for long periods of time.

It has now been discovered that azine dyestuff images which are more stable than the quinonimine and azo methine dyestuff images can be formed by color-forming development while utilizing the conventional primary aromatic amino developers if there be selected for the color-forming components aromatic compounds containing an amino group in the 1-position and having a reactive coupling position para to the amino group, and in the 3-position a grouping capable of undergoing ring closure with the intermediary azo methine or quinonimine to yield an azine dyestuff.

It is accordingly an object of this invention to produce azine dyestuff images by color forming development.

It is a further object of this invention to produce azine dyestuff images by the color development of a silver halide emulsion containing color-forming components having particular substituents in ortho position to the active coupling position.

It is a further object of this invention to provide silver halide emulsions containing color-forming components which when reacted with the oxidation products of a primary aromatic amino developer yield azine dyestuff images.

It is a further object of this invention to provide color developers containing a primary aromatic amino developer and a color-forming component which upon reaction with the oxidation products of the developer yield azine dyestuff images.

Other and further important objects of the invention will become apparent as the description proceeds.

Color-forming components which we have found will yield the azine dyestuff images upon reaction with the oxidation products of a primary aromatic amino developer and subsequent ring closure are as stated aromatic compounds containing in the 1-position of the aryl ring an amino group which may be primary, secondary or tertiary and which contains in para position to such an amino group a free coupling position. By the term "free coupling position" is meant an unsubstituted position or one containing a group which is displaced during color development and of the nature previously specified.

The azine ring system forming a component part of the desired azine dyes has the following configuration:

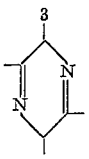

in which the numeral 3 indicates the 3-position of the aromatic amino coupling components. The substituents in the 3-position of such aromatic amines must therefore be such as to contribute a nitrogen atom to the azine ring system and at the same time have the ability to facilitate closure of the ring with the elimination of certain atoms. We have ascertained that substituents which answer these prerequisites have the formula —NHZ— wherein Z is an organic atom grouping more negative than hydrogen (in the sense this term is employed in U. S. P. 2,378,169), and which is capable of being split off with hydrogen during the ring closure operation.

It has been stressed that the grouping —NHZ— must participate in the closure of the ring in the system obtained by the reaction of the aromatic amino coupling component with the oxidation products of the developer, or, in other words, with the intermediary quinonimine. Paraphrasing this, such substituent must not contain any grouping which during color development reacts in a way to impede ring closure. This means that Z must not contain a free coupling position for in that event it is quite likely to react with the oxidized developer to yield a stable system unamenable to ring closure. For instance, should Z contain a phenolic hydroxyl group and in para position thereto a free coupling position, the oxidized developer would quite likely couple in such free position producing a system which would preclude the desired ring closure necessary for the formation of the azines.

The aromatic amines which we have found to be suitable for our purpose in that they meet the requirements stressed above are of the following general formula:

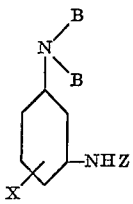

in which B is hydrogen or a hydrocarbon radical such as alkyl, i. e., methyl, ethyl, butyl and the like, aryl, i. e., phenyl, naphthyl and the like, Z may be

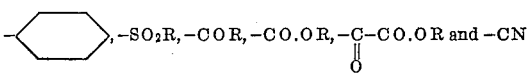

in which R is alkyl, such as methyl, ethyl, propyl, butyl, amyl, octyl, cetyl and the like, or aryl, such as phenyl, naphthyl and the like, or acylaminoaryl, such as acetylaminophenyl, butyrylaminophenyl, stearylaminophenyl and the like, and X is hydrogen, alkyl, as above, or aromatic such as phenyl, diphenyl, naphthyl, nitrophenyl, chlorophenyl, alkoxyphenyl, i. e., methoxyphenyl, ethoxyphenyl and the like, arylsulfonylaminophenyl, such as benzsulfonylaminophenyl and the like, or a fused-on aryl, such as benzo, sulfobenzo, naphtho and the like. As shown by the specific examples given below, it is preferable where Y is arylamino that X be a fused-on aryl.

Examples of compounds which fall within the above category and which have been found suitable for the production of the azine dyestuff images by color-forming development are the following:

3'-amino benzenesulfon-p-toluidide

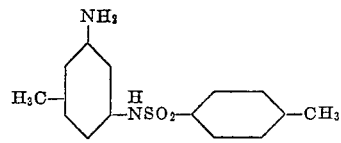

1,3-dianilino-naphthalene-8-sulfonic acid

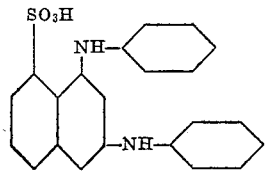

N-octadecyl-1,3-di-(3'-sulfoanilino)-8-naphthalene sulfonamide

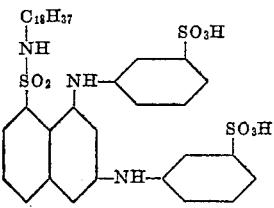

3-cyanoamino-6-methyl dimethylaniline

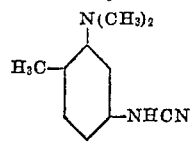

3-carbethoxy amino-6-methyl dimethylaniline

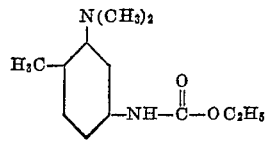

3-acetamidodiethylaniline

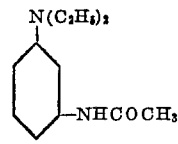

3-ethoxalylamido-6-methyl-diethylaniline

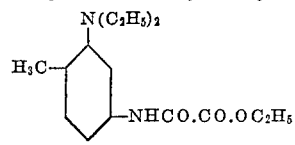

3'-aminomethanesulfonanilide

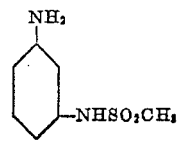

2,543,338

3'-amino-4-stearamidobenzenesulfonanilide 4,4'-di-(phenylsulfonamido)-3-aminobiphenyl

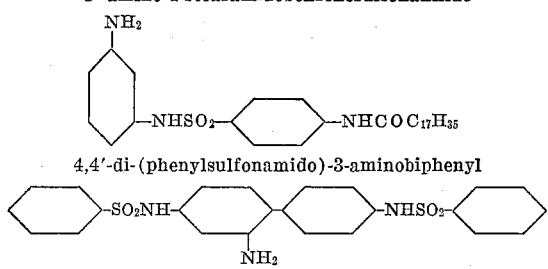

These compounds can be prepared by methods known to the art. For instance, compounds in which the aryl ring is substituted by an aryl or alkyl sulfonamido group can be obtained by reacting a 3-nitro-arylamine or a 3-dialkylamino-arylamine with benzene sulfonyl chloride in the presence of an acid binding agent such as pyridine and the like, followed by reduction of the nitro group provided that the 3-nitro compound is employed as the starting material. The preparation of such compounds may be graphically illustrated as follows:

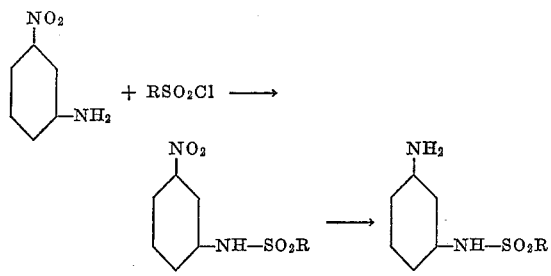

Compounds in which the 1- and 3-positions are substituted by arylamino groups can be prepared by heating with an arylamine and an arylamine hydrochloride, for instance, aniline and aniline hydrochloride, a 3-sulfoarylamine or a 3-sulfophenol. This reaction may be graphically represented as follows:

Alternatively, said compounds may be produced by heating a 1.3-dihydric phenol with sodium sulfite and heating the resulting sulfite addition product with an arylamine hydrochloride such as aniline hydrochloride. This reaction may be graphically represented as follows:

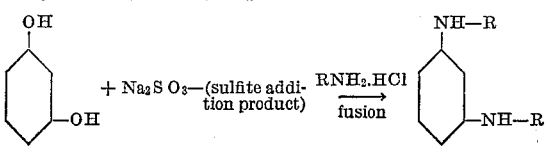

Compounds containing the cyano amino group may be obtained by reacting the arylamine with cyanogen chloride. On the other hand, compounds containing a carbethoxy amino group (aryl urethanes) may be formed by reaction of a primary arylamine with, for example, ethyl chloro carbonate in the presence of an acid-binding agent such as pyridine.

Compounds containing an acetamide group in 3-position are produced by reacting a primary arylamine with acetyl chloride. Compounds containing the oxalyl amino group in 3-position are obtained by reacting a primary arylamine with the mono-ethylester of oxalyl chloride or with ethyl oxalate.

3'-amino-4-stearoylamidobenzenesulfonanilide is obtained by reacting 3-nitro-aniline with p-acetylaminobenzenesulfonyl chloride in the presence of an acid-binding agent such as pyridine, treating the resulting product with an alkali to split off the acetyl group, heating the resulting compound with stearoyl chloride in the presence of an acid-binding agent such as pyridine, and reducing the product thus obtained in ethyl alcohol by means of hydrogen and a Raney nickel catalyst. The sequence of steps involved may be illustrated as follows:

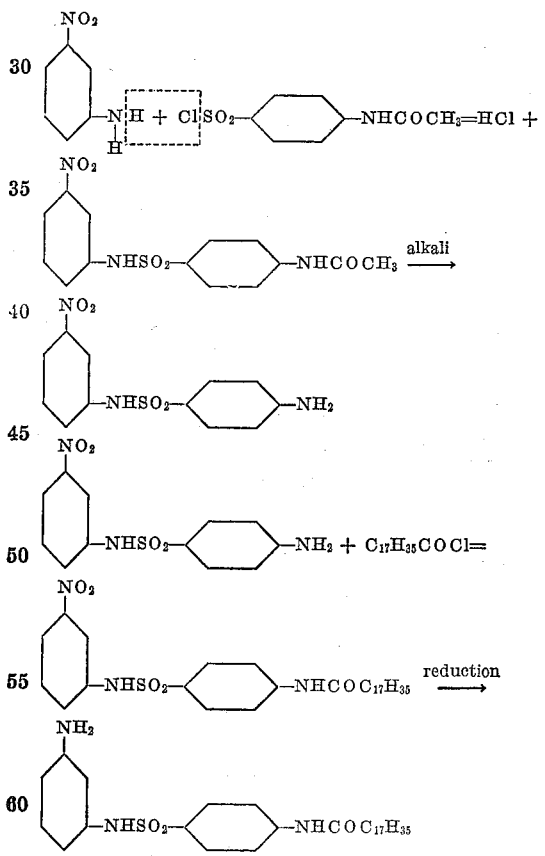

4,4'-di-(phenylsulfonamido)-3-aminobiphenyl is obtained by starting from 3-nitrobenzidine, heating the same with benzenesulfonyl chloride in the presence of an acid-binding agent and reducing the nitro group as above.

N-octadecyl-1,3-di-(3'-sulfoanilino)-8-naphthalene sulfonamide is obtained by treating 1.3-diamino naphthalene-8-sulfonic acid (Beilstein, vol. 14, p. 756) with acetic anhydride to block the amino groups. The resulting compound is then subjected to the action of phosphorus pentachloride to convert the sulfo group to a sulfonyl chloride group. This product is then heated with stearylamine in the presence of an acid acceptor to convert the sulfonyl chloride group to a sulfonamide group. By treatment in an aqueous alkaline solution, the blocked amino groups are subjected to hydrolysis with regeneration of the primary amino groups. The resulting product is then treated with metanilic acid according to the Bucherer reaction to give the desired end product.

The reaction by which the azine dyestuffs are produced involves two conversions which may take place spontaneously or in an observable sequence, the first involving the formation of a quinonimine dye and the second involving ring closure to produce the azine compound. The azine compound so formed may be present as the anhydride of the free base. Upon acidification, the true azine salt is formed which possesses a characteristically brilliant color.

The course of the reaction, in which it is possible to observe definite steps, may be illustrated by the reaction between the oxidation products of para-amino dimethyl aniline and 3'-aminobenzenesulfon-p-toluidide. This reaction may proceed as follows:

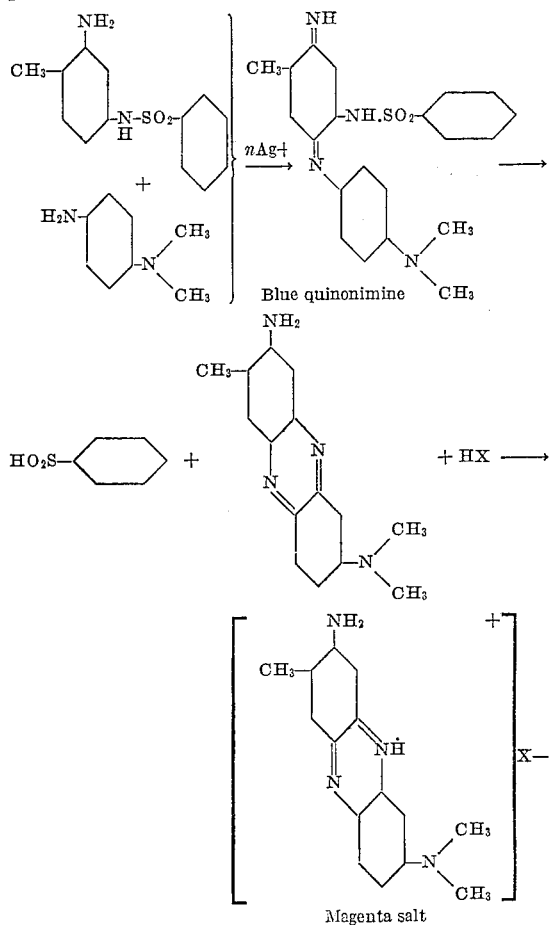

Magenta salt

It will be observed that in this reaction the blue quinonimine dye is first formed, which ring closes due to the presence of the sulfonamido group in 3-position to the azine anhydride. The latter by acidification is converted into the azine salt which is characterized by a brilliant magenta color.

The invention may be carried into effect in various ways. One method of realizing the formation of the azine dyestuff images involves exposing a silver halide emulsion and subjecting it to the action of a primary aromatic amino developer such as para-amino dimethyl aniline containing one of the aforesaid color-forming components or the silver halide emulsion may be exposed, developed to black-and-white and later subjected to the action of such a developer. On the other hand, the color-forming component may be incorporated in the emulsion and after exposure subjected to the action of a primary aromatic amino developer. In the latter case, it is advisable to employ the color forming components in a form in which they are fast to diffusion in the gelatin. This result may be achieved by the following procedures outlined in United States Patents 2,186,852, 2,186,851, 2,-186,849, 2,186,734, 2,186,733, 2,186,732, 2,179,244, 2,186,719, 2,178,612, 2,280,722, 2,292,575, 2,307,399 and 2,303,928. Preferably, however, the color former is rendered fast to diffusion by including in the molecule thereof a radical having an alkyl chain of 5 carbon atoms or more such as decyl, dodecyl, stearyl, oleyl or the like radical. An example of a compound which has been rendered fast to diffusion by the inclusion of a long alkyl chain is given above.

In order to facilitate the incorporation of the color formers in the silver halide emulsion or in the developer, the compounds may contain substituents which increase the solubility of the compounds in aqueous or in alkaline solutions. Such groups are, for instance, sulfonic acid groups, carboxylic acid groups, sulfonamide groups and hydroxy ethenoxy ether groups. Example of a compound containing a water-solubilizing group, i. e., a sulfonic acid group, has been given above. This group may be replaced in the involved compound by a carboxylic acid or a hydroxy ethenoxy ether group.

The following examples will serve to illustrate the invention but it is to be understood that the invention is not limited thereto.

*Example I*

To 100 g. of a photographic silver halide emulsion is added 0.5 g. of 1,3-di-anilino-naphthalene-8-sulfonic acid-sodium salt. The emulsion is then coated on a transparent film support and dried. After exposure the film is developed in a color-forming developer comprising

| | | |
|---|---|---|
| Water | cc. | 1000 |
| Sodium sulfite | g. | 0.5 |
| p-Diethylamino-aniline | g. | 2.5 |
| Sodium carbonate | g. | 70 |
| Potassium bromide | g. | 2.5 |

A silver plus dye image is formed. After removal of the silver by bleaching in potassium-ferricyanide solution and subsequent fixation, a blue dye image, stable to acid, remains.

Instead of developing the exposed film in a color-forming developer, it may be developed to give a black-and-white negative image. The residual silver halide is then exposed and color developed with the above solution. After removal of the silver by means of potassium ferricyanide, a positive blue dyestuff image is obtained.

*Example II*

An exposed photographic silver bromide emulsion is developed in a color forming developer of the following composition:

| | | |
|---|---|---|
| Water | cc. | 1000 |
| Sodium sulfite | g. | 0.5 |
| p-Diethylamino-aniline | g. | 2.5 |
| Sodium carbonate | g. | 70 |
| Potassium bromide | g. | 2.5 |
| 3'-aminobenzenesulfon-p-toluidide | g. | 1 |

The image first appears bluish-black, then turns to brownish-black. After removal of the silver image, an orange dye image remains. Upon immersion into dilute hydrochloric acid, a brilliant magenta dye image appears.

*Example III*

To the developer solution of Example I there is added one gram per liter of 3-acetamido-diethyl-aniline dissolved in methanol. A silver bromide emulsion is exposed and developed in this solution. After removal of the silver by means of potassium ferricyanide and acidification by the immersion of the emulsion into dilute hydrochloric acid, a magenta image is obtained.

Various modifications of the invention will occur to persons skilled in the art and we therefore do not intend to be limited in the patent granted except as necessitated by the appended claims.

We claim:
1. The process of producing azine dyestuff images in a photographic silver halide emulsion which comprises developing an exposed silver halide emulsion in a primary aromatic amino developer in the presence of an aromatic compound having the following formula:

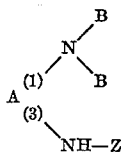

where in A is an aromatic radical, B is a member selected from the class consisting of hydrogen and hydrocarbon radicals, and Z is a radical selected from the class consisting of

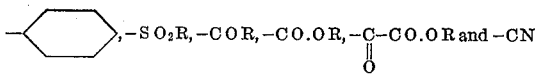

R being a member of the class consisting of alkyl, aryl and acylaminoaryl, said compound having a free coupling position in the 4-position, said radical Z having no free coupling position.

2. A photographic silver halide emulsion containing a color forming component capable of producing an azine dyestuff image upon reaction with the oxidation products of a primary aromatic amino developer consisting of a compound having the following formula:

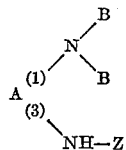

wherein A is an aromatic radical, B is a member selected from the class consisting of hydrogen and hydrocarbon radicals, and Z is a radical selected from the class consisting of

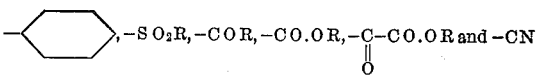

R being a member of the class consisting of alkyl, aryl and acylaminoaryl, said compound having a free coupling position in the 4-position, said radical Z having no free coupling position.

3. A photographic developer for a developable image in a silver halide emulsion containing a primary aromatic amino developing substance and an aromatic compound capable of reacting with the oxidation products thereof to produce an azine dyestuff, said aromatic compound having the following formula:

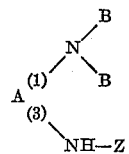

wherein A is an aromatic radical, B is a member selected from the class consisting of hydrogen and hydrocarbon radicals, and Z is a radical selected from the class consisting of

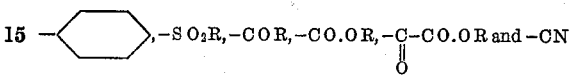

R being a member of the class consisting of alkyl, aryl and acylaminoaryl, said compound having a free coupling position in the 4-position, said radical Z having no free coupling position.

4. The composition as defined in claim 2 wherein the color forming component contains a group rendering it fast to diffusion in the emulsion.

5. The composition as defined in claim 3 wherein the color forming component contains a water solubilizing group.

6. The process of producing azine dyestuff images in a silver halide emulsion which comprises developing the emulsion with a primary aromatic amino developer in the presence of an aromatic amine having in the 1-position the grouping

wherein B is selected from the class consisting of hydrogen and hydrocarbon radicals and in the 3-position an acylamino group, the nitrogen atom of which is directly linked to the ring, said aromatic amine having a free coupling position para to the

grouping and said acylamino group having no free coupling position.

7. The process as defined in claim 6 wherein B is alkyl.

8. The process of producing azine dyestuff images in a silver halide emulsion which comprises developing the emulsion with a primary aromatic amino developer in the presence of an aromatic amine having in the 1-position the grouping

B being selected from the class consisting of hydrogen and hydrocarbon radicals, and in the 3-position an aryl sulfonylamino group, said amine having a free coupling position para to the grouping

said grouping in the 3-position having no free coupling position.

9. The process of producing azine dyestuff images in a silver halide emulsion which comprises developing the emulsion with a primary aromatic amino developer in the presence of an aromatic amine having in the 1-position the grouping

B being selected from the class consisting of hydrogen and hydrocarbon radicals, and in the 3-position an alkyl sulfonylamino group, said amine having a free coupling position para to the grouping

and said grouping in the 3-position having no free coupling position.

10. The process of producing azine dyestuff images in a silver halide emulsion which comprises developing the emulsion with a primary aromatic amino developer in the presence of an aromatic diamine having an aryl amino group in the 1- and 3-positions, the nitrogen atom of said aryl amino group being directly linked to the ring, said aromatic diamine having a free coupling position in the 4-position and the grouping in 3-position having no free coupling position.

11. A photographic silver halide emulsion containing a color-forming component capable of reacting with the oxidation products of a primary aromatic amino developer to produce an azine dye, said component being an aromatic amine having in the 1-position the grouping

B being selected from the class consisting of hydrogen and hydrocarbon radicals and in the 3-position and acylated amino group, the nitrogen atom of which is directly linked to the ring, said aromatic amine having a free coupling position in the 4-position and said grouping in the 3-position having no free coupling position.

12. A photographic silver halide emulsion as defined in claim 11 in which the amino group in the 1-position of the aromatic amine is a dialkylamino group.

13. A photographic silver halide emulsion as defined in claim 11 wherein the acylated amino group in the 3-position is an aryl sulfonylamino group.

14. A photographic silver halide emulsion as defined in claim 11 in which the acylamino group in 3-position is an alkyl sulfonylamino group.

15. A photographic silver halide emulsion containing a color forming component capable of reacting with the oxidation products of a primary aromatic amino developer to produce an azine dye, said component being an aromatic diamine having in the 1- and 3-positions an arylamino group, the nitrogen atom of which is directly linked to the ring, said aromatic amine having a free coupling position in the 4-position, and said group in the 3-position having no free coupling position.

16. A photographic color-forming developer for a developable image in a silver halide emulsion comprising a primary aromatic amino developing agent and a color forming component capable of reacting with the oxidation products thereof to produce an azine dye, said component being an aromatic amine having in the 1-position the grouping

wherein B is selected from the class consisting of hydrogen and hydrocarbon radicals, and having in the 3-position an acylated amino group, the nitrogen atom of which is directly linked to the ring, said aromatic amine having a free coupling position in the 4-position and said grouping in the 3-position having no free coupling position.

17. A photographic color forming developer for a developable image in a silver halide emulsion containing an aromatic amine as the developing agent and a color forming component capable of reacting with the oxidation products of such amine to produce an azine dye, said component being an aromatic diamine having in the 1- and 3-positions an arylamino group, the nitrogen atom of which is directly linked to the ring, said aromatic diamine having a free coupling position in the 4-position and said group in the 3-position having no free coupling position.

18. A photographic silver halide emulsion containing a color forming component capable of reacting with the oxidation products of a primary aromatic amino developer to produce an azine dye, said component being 1.3-di-anilino naphthalene-8-sulfonic acid.

19. A photographic color forming developer for a developable image in a silver halide emulsion containing a primary aromatic amine as the developing agent and a color forming component capable of reacting with the oxidation products of said amine to produce an azine dye, said component being 3-amino benzene sulfon-p-toluidide.

20. A photographic color forming developer for a developable image in a silver halide emulsion containing a primary aromatic amine as the developing agent and a color forming component capable of reacting with the oxidation products thereof to produce an azine dye, said component being 3-acetamidodiethyl aniline.

WILLY A. SCHMIDT.
JOSEPH A. SPRUNG.

REFERENCES CITED

The following references are of record in the file of this patent:

UNITED STATES PATENTS

| Number | Name | Date |
|---|---|---|
| 2,343,051 | Frohlich et al. | Feb. 29, 1944 |
| 2,367,531 | Salminen et al. | Jan. 16, 1945 |
| 2,423,730 | Salminen et al. | July 8, 1947 |

FOREIGN PATENTS

| Number | Country | Date |
|---|---|---|
| 503,752 | Great Britain | Apr. 11, 1939 |